(12) United States Patent
Rettig et al.

(10) Patent No.: US 9,852,559 B2
(45) Date of Patent: Dec. 26, 2017

(54) SYSTEM AND METHOD FOR SIGNIFYING INTENT FOR LOCK OPERATION

(71) Applicant: Schlage Lock Company LLC, Indianapolis, IN (US)

(72) Inventors: Raymond F. Rettig, Fishers, IN (US); Michelle Vickrey, Indianapolis, IN (US); Michael Cahill, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 71 days.

(21) Appl. No.: 14/728,460

(22) Filed: Jun. 2, 2015

(65) Prior Publication Data

US 2015/0348344 A1    Dec. 3, 2015

Related U.S. Application Data

(60) Provisional application No. 62/006,801, filed on Jun. 2, 2014.

(51) Int. Cl.
*G06F 3/00* (2006.01)
*G06F 3/01* (2006.01)
(Continued)

(52) U.S. Cl.
CPC .......... *G07C 9/00182* (2013.01); *G06F 3/011* (2013.01); *G06F 3/017* (2013.01);
(Continued)

(58) Field of Classification Search
CPC ............ G07C 2209/63; G07C 9/00182; G07C 2009/00793; G07C 2209/04; G07C 2209/64; G07C 9/00007; G07C 9/00015; G07C 9/00103; G07C 9/00111; G07C 9/00309; G07C 9/00571; G07C 9/00; E05B 47/00; G06F 21/305; G06F 21/35; G06F 21/32; G06F 21/34; G06F 3/017;
(Continued)

(56) References Cited

U.S. PATENT DOCUMENTS

2012/0234058 A1    9/2012  Neil et al.
2013/0176107 A1*   7/2013  Dumas ............... G07C 9/00571
                                              340/5.61
(Continued)

FOREIGN PATENT DOCUMENTS

FR        3008510      *   1/2015

OTHER PUBLICATIONS

International Search Report; International Searching Authority, US Patent and Trademark Office; International PCT Application No. PCT/US2015/033833; Sep. 3, 2015; 2 pages.
(Continued)

*Primary Examiner* — Dionne H Pendleton
(74) *Attorney, Agent, or Firm* — Taft Stettinius & Hollister LLP

(57) ABSTRACT

A lock device is configured to receive a credential from a mobile device. The lock device is configured to monitor the distance between the mobile device and the lock device. The lock device is configured to detect an intent action by a user of the mobile device and unlock the lock device if the mobile device is within a predetermined distance from the lock device and the intent action is an approved intent action.

10 Claims, 3 Drawing Sheets

(51) Int. Cl.
*G07C 9/00* (2006.01)
*G06F 3/0488* (2013.01)
*G06F 17/30* (2006.01)

(52) U.S. Cl.
CPC ........ *G06F 3/0488* (2013.01); *G06F 17/3087* (2013.01); *G06F 2200/1636* (2013.01); *G07C 2209/63* (2013.01)

(58) Field of Classification Search
CPC ........ G06F 3/0346; G06F 13/28; G06F 1/163; G06F 2203/0384; G06F 3/005; G06F 3/013; G06F 3/044; G06F 3/04883; G06F 3/162; H04L 63/107; H04L 63/0853; H04L 67/12; H04L 41/026; H04L 63/0861; H04W 12/08; H04W 4/008; H04W 4/02; H04W 4/021; H04W 4/043; H04W 4/046; H04W 4/14; H04W 12/06; H04W 48/04; H04W 64/003; H04W 64/006; H04W 68/005; H04W 84/18; H04W 8/18; H04M 1/6091; H04M 1/72577; H04M 2250/10; H04M 2250/12; H04M 1/7253; G06Q 20/322; G06Q 20/3276; G06Q 20/40145; G06T 7/73; G07F 19/20; H04N 7/183; H04B 5/06
See application file for complete search history.

(56) References Cited

U.S. PATENT DOCUMENTS

| | | |
|---|---|---|
| 2013/0257589 A1 | 10/2013 | Mohiuddin et al. |
| 2014/0077929 A1 | 3/2014 | Dumas et al. |
| 2014/0111415 A1* | 4/2014 | Gargi .................... G06F 3/017 345/156 |
| 2015/0286813 A1* | 10/2015 | Jakobsson ............... G06F 21/35 726/9 |
| 2016/0021238 A1* | 1/2016 | Abramson ............ H04W 48/04 455/418 |
| 2016/0027399 A1* | 1/2016 | Wilde ................... G06F 13/382 345/520 |
| 2016/0147988 A1* | 5/2016 | Mutz .................... H04L 63/107 726/17 |
| 2016/0337863 A1* | 11/2016 | Robinson .............. H04W 12/08 |

OTHER PUBLICATIONS

Written Opinion of the International Searching Authority; International Searching Authority, US Patent and Trademark Office; International PCT Application No. PCT/US2015/033833; Sep. 3, 2015; 4 pages.

* cited by examiner

SYSTEM AND METHOD FOR SIGNIFYING INTENT FOR LOCK OPERATION

CROSS REFERENCE TO RELATED APPLICATIONS

The present application claims the benefit of U.S. Provisional Patent Application No. 62/006,801 filed on Jun. 2, 2014, the contents of which are hereby incorporated by reference in their entirety.

BACKGROUND

The present application generally relates to operation of a lock, and more particularly relates to unlocking a lock or access control device with a mobile device. Locks may be unlocked in various ways. Some existing systems have various shortcomings relative to certain applications. Accordingly, there remains a need for further contributions in this area of technology.

BRIEF SUMMARY

One embodiment of the present invention is directed to a unique system and method for controlling operation of a lock. Other embodiments include apparatuses, systems, devices, hardware, methods, and combinations for controlling operation of a lock. Further embodiments, forms, features, aspects, benefits, and advantages of the present application shall become apparent from the description and figures provided herewith.

BRIEF DESCRIPTION OF THE FIGURES

The description herein makes reference to the accompanying figures wherein like reference numerals refer to like parts throughout the several views, and wherein.

DESCRIPTION OF THE ILLUSTRATED EMBODIMENTS

Figure 1:
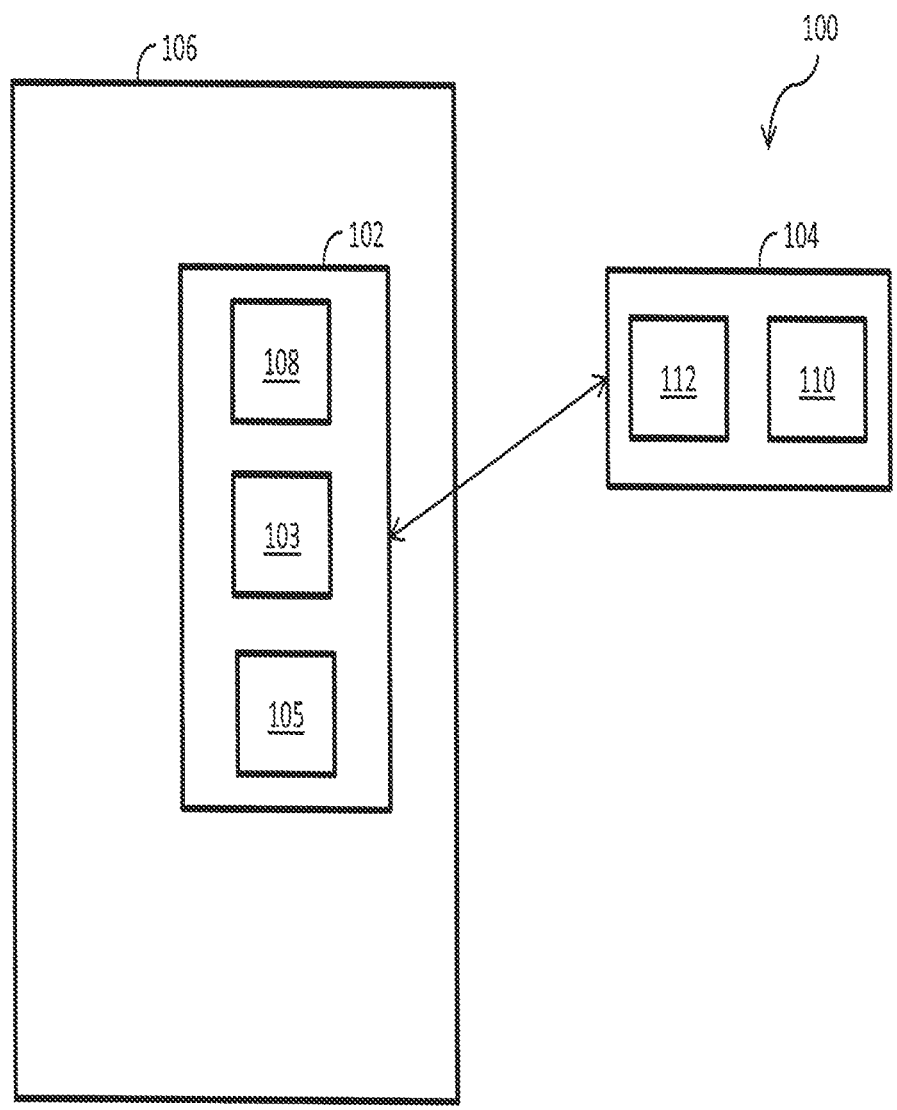
FIG. 1 is a schematic block diagram of an exemplary system.

For the purposes of promoting an understanding of the principles of the invention, reference will now be made to the embodiments illustrated in the drawings and specific language will he used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

The present application is generally directed to signifying intent for operating a lock device or an access control device. FIG. 1 illustrates a system 100 including a lock device 102, a mobile device 104, and a door 106. The lock device 102 is located on or near the door 106 to control access to the area protected by the door 106. The system 100 is configured as an access control system. However, in other embodiments, the system 100 may be a payment system, a transportation system, or any other type of access control system known to those having skill in the art.

The lock device 102 may be an electronic lock, a reader, a payment terminal, and/or any other type of device that can communicate with the mobile device 104. The lock device 102 may include a transceiver 108 to communicate with a transceiver 110 of the mobile device 104 via a communication protocol such as, for example, Bluetooth, near field communication (NFC), Wi-Fi, and other communication protocols. The lock device 102 may also include a lock mechanism 103 such as, for example, a latch, a bolt, and the like that is used to lock and unlock the lock device 102 for restricting access to the door 106. The lock device 102 may also include an accelerometer 105 to detect an intent action. The intent action may be used, among other information, by the lock device 102 to determine whether the lock device 102 should unlock the lock mechanism 103 so that the user of the mobile device 104 may have access to the area protected by the door 106.

The mobile device 104 may be a smartphone, a mobile phone, a tablet computer, a watch, smartcard, and/or any other device capable of transmitting a credential 112 to the lock device 102. The credential 112 is capable of indicating to the lock device 102 from a relatively great distance (e.g., several meters) that a user of the mobile device 104 is authorized to access the area protected by the door 106 such as, for example, when the lock device 102 and the mobile device 104 pair with one another via Bluetooth communication. The credential 112 may be a unique number, a unique identifier, a personal identification number (PIN), an address and/or any other type of information that uniquely identifies the mobile phone 104. In one example, the mobile device 104 may transmit the credential 112 to the lock device 102 in order for the mobile device 104 and the lock device 102 to be paired together using, for example, Bluetooth communication. In this example, the credential 112 constitutes unique information that facilitates pairing or wirelessly connecting the mobile device 104 and the lock device 102.

In one embodiment, as a user is located relatively close to the door 106, the lock device 102 automatically unlocks the lock mechanism 103. The lock device 102 may connect with the mobile device 104 from a relatively long range (>10 m) to determine that the credential 112 is approaching the lock device 102. The lock device 102 can determine that the mobile device 104 is approaching by analyzing the radio signal strength (e.g., received signal strength indicator (RSSI)) received at the lock device 102 or at higher abstracted levels such as Apple's iBeacon technology.

In some circumstances, a user could walk past a door not intending to unlock the door or lock device such as, for example, when the user is located inside a house and a stranger is located outside of the house. The lock device 102 may use the accelerometer 105 to detect or identify an intent action from a user. The intent action indicates to the lock device 102 to unlock the lock mechanism 103 once the lock device 102 detects or recognizes the user has approached the door 106.

The accelerometer 105 in the lock device 102 may detect the intent action by the user of the mobile device 104. For example, when the user is located close to the door 106, the lock device 102 may unlock the lock mechanism 103 when the accelerometer 105 detects an intent action (e.g., a specific vibration signature) such as the rotation of a lever on the door 106. Any one or combination of intent actions (e.g., specific vibration signatures) could be sensed such as, for example, rotating a knob or lever on the lock device 102 or the door 106, pressing a thumb-piece on the lock device 102, kicking the door 106, knocking on the door 106, and/or bumping a car key fob to the door 106, among other vibrations or intent actions.

This technique may be used for approaching the door 106 from either the outside or inside. In some cases, the user may approach the door 106 and be located near it, but may change their mind and stay by the door 106 to talk to a neighbor or change direction and move away. For these cases, it may not be desirable to allow the lock device 102 to forever be looking for the intent action. This circumstance may be addressed in at least two ways: (1) an intent time window could be constructed so that if the user arrives at the door 106 and does not perform the intent action within a specific amount of time, then the intent action will not be recognized by the lock device 102 to unlock; or (2) the distance between the mobile device 104 and the lock device 102 could be monitored so that if the user is detected as moving away from the door 106, then any intent action will not be recognized by the lock device 102 to unlock.

Additionally, there are at least two ways to address situations where a stranger approaches the door 106 from the outside and the user approaches the door 106 from the inside. In one embodiment, the system 100 could be designed with a lockout feature where if one or more intent actions (e.g., certain signatures) are detected at the door 106 before the credential 112 arrives at the door 106, then the lock device 102 would ignore the intent action(s) even if the credential 112 comes to the door 106 shortly afterwards. In one example, a stranger comes to the door 106 and knocks. The knock is sensed by the accelerometer 105, but because there is no credential 112 near lock device 102, the lock device 102 disables any response or ignores the intent action. Then, if the user inside hears the knock and approaches the door 106 with the mobile device 104 and credential 112, any further intent actions by the stranger will be ignored or not recognized as an intent action for the lock device 102 to unlock.

In another embodiment, the lock device 102 may be configured to require two or more intent actions to signify intent within a predetermined timeframe of one another. For example, the lock device 102 could be configured such that the user normally bumps his or her knuckle to the door 106 and then rotates the lever within two (2) seconds. A stranger on the outside would have to do this specific action to gain access.

In some embodiments, the detection of signatures yields application usage data for doors that have a thumb-piece on the outside of the door and a lever on the inside of the door, which could inform the system if ingress or egress is occurring.

Figure 2:
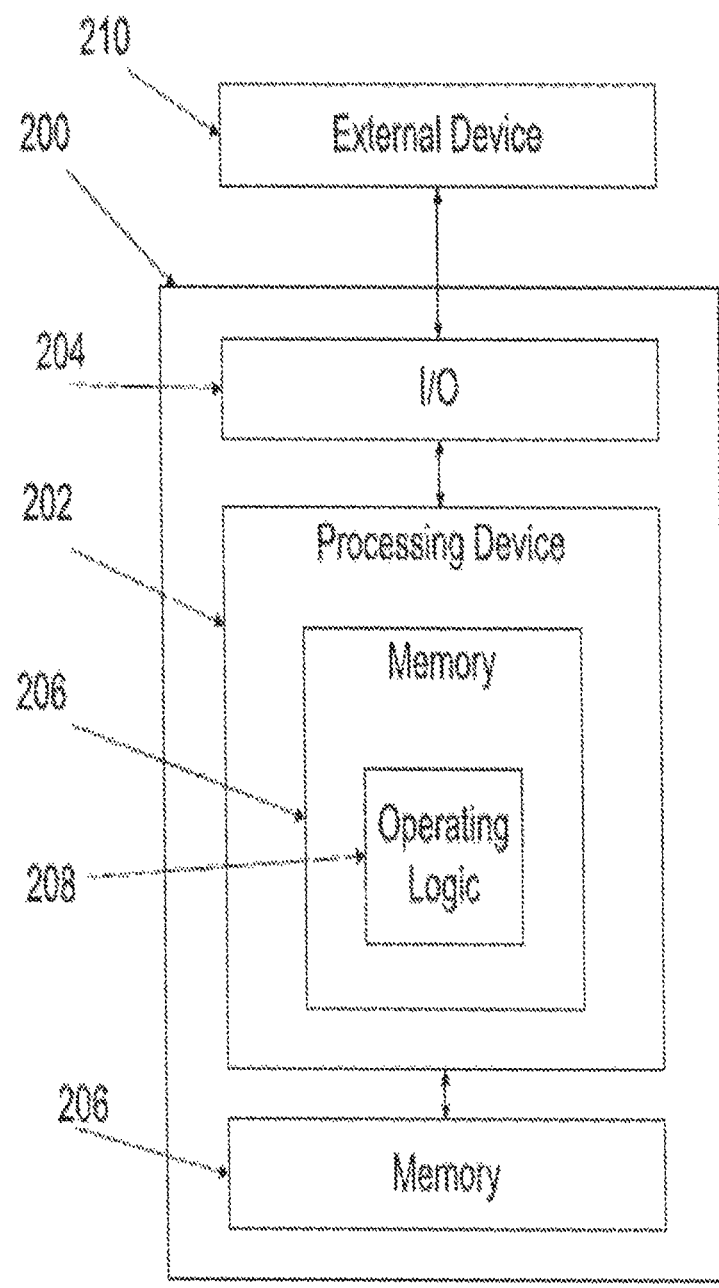
FIG. 2 is a schematic block diagram of an exemplary computing device.

FIG. 2 is a schematic block diagram of a computing device 200. The computing device 200 is one example of a lock device and/or mobile device that may be utilized in connection with the lock device 102 and/or the mobile device 104 shown in FIG. 1. Computing device 200 includes a processing device 202, an input/output device 204, memory 206, and operating logic 208. Furthermore, computing device 200 communicates with one or more external devices 210.

The input/output device 204 allows the computing device 200 to communicate with the external device 210. For example, the input/output device 204 may be a transceiver, network adapter, network card, interface, or a port (e.g., a USB port, serial port, parallel port, an analog port, a digital port, VGA, DVI, HDMI, FireWire, CAT 5, or any other type of port or interface). The input/output device 204 may be comprised of hardware, software, and/or firmware. It is contemplated that the input/output device 204 will include more than one of these adapters, cards, or ports.

The external device 210 may be any type of device that allows data to be inputted or outputted from the computing device 200. For example, the external device 210 may be a mobile device, lock device, a reader device, equipment, a handheld computer, a diagnostic tool, a controller, a computer, a server, a processing system, a printer, a display, an alarm, an illuminated indicator such as a status indicator, a keyboard, a mouse, or a touch screen display. Furthermore, it is contemplated that the external device 210 may be integrated into the computing device 200. It is further contemplated that there may be more than one external device in communication with the computing device 200.

Processing device 202 can be a programmable type, a dedicated, hardwired state machine; or a combination of these; and it can further include multiple processors, Arithmetic-Logic Units (ALUs), Central Processing Units (CPUs), Digital Signal Processors (DSPs), or the like. Processing devices 202 with multiple processing units may utilize distributed, pipelined, and/or parallel processing. Processing device 202 may be dedicated to performance of just the operations described herein or may be utilized in one or more additional applications. In the depicted form, processing device 202 is of a programmable variety that executes algorithms and processes data in accordance with operating logic 208 as defined by programming instructions (such as software or firmware) stored in memory 206. Alternatively or additionally, operating logic 208 for processing device 202 is at least partially defined by hardwired logic or other hardware. Processing device 202 can be comprised of one or more components of any type suitable to process the signals received from input/output device 204 or elsewhere, and provide desired output signals. Such components may include digital circuitry, analog circuitry, or a combination of both.

Memory 206 may be of one or more types, such as a solid-state variety, electromagnetic variety, optical variety, or a combination of these forms. Furthermore, memory 206 can be volatile, nonvolatile, or a combination of these types, and some or all of memory 206 can be of a portable variety, such as a disk, tape, memory stick, cartridge, or the like. In addition, memory 206 can store data that is manipulated by the operating logic 208 of processing device 202, such as data representative of signals received from and/or sent to input/output device 204 in addition to or in lieu of storing programming instructions defining operating logic 208, just to name one example. As shown in FIG. 2, memory 206 may be included with processing device 202 and/or coupled to the processing device 202.

Figure 3:
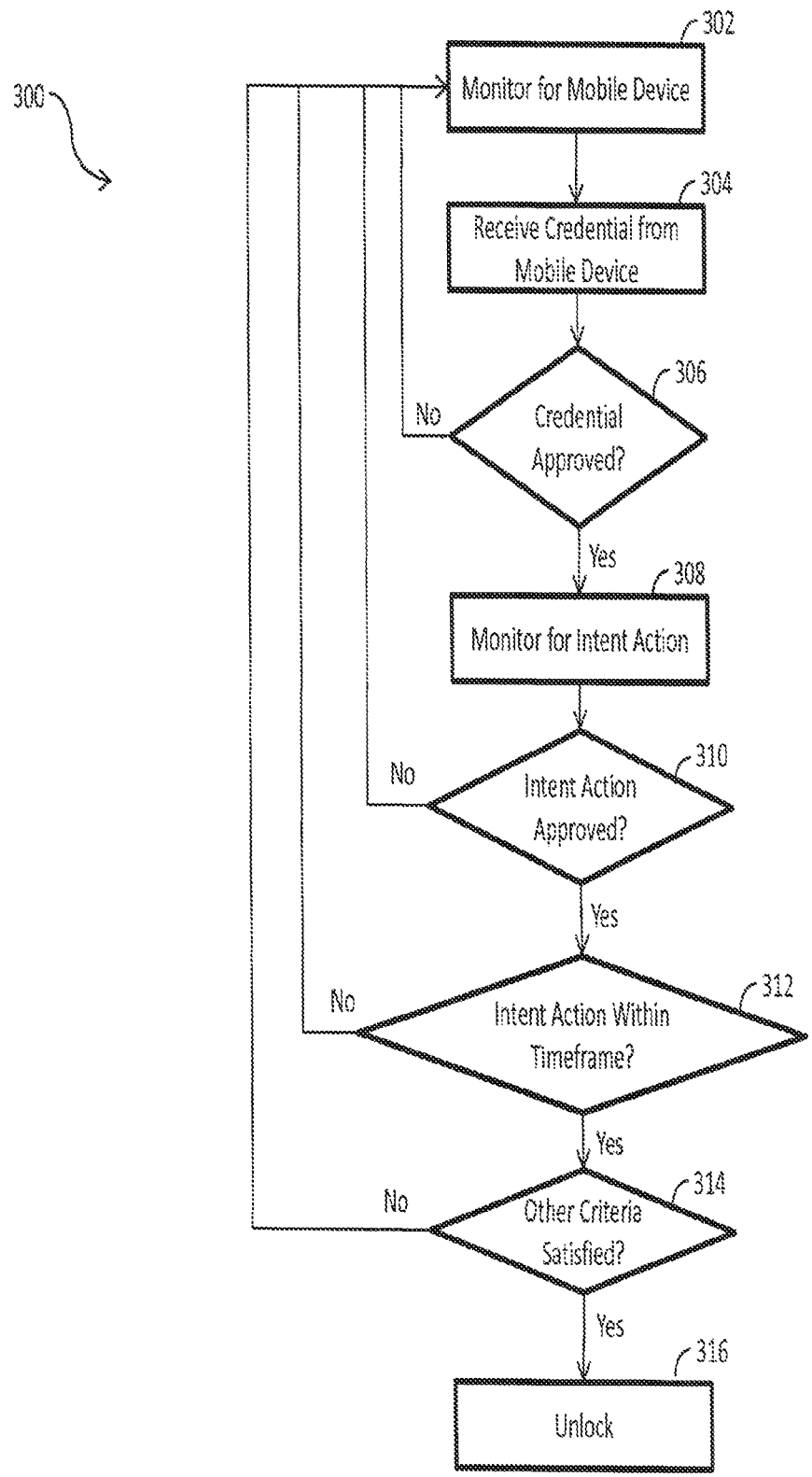
FIG. 3 is a schematic flow diagram of an exemplary process for unlocking a lock device.

FIG. 3 illustrates a schematic flow diagram of an exemplary process 300 for unlocking a lock device. Operations illustrated for all of the processes in the present application are understood to be exemplary only, and operations may be combined or divided, and added or removed, as well as re-ordered in whole or in part, unless explicitly stated to the contrary.

Process 300 begins with operation 302 in which the lock device 102 monitors for a mobile device 104 to connect to wirelessly such as, for example, via Bluetooth communication. It is contemplated that in some embodiments, the mobile device 104 may be monitoring for a lock device 102 to connect to over Bluetooth communication or another protocol.

Process 300 proceeds from operation 302 to operation 304. At operation 304, during the setup of the wireless connection or after the connection is established between the lock device 102 and the mobile device 104, the mobile device 104 transmits a credential 112 to the lock device 102. In some embodiments, the mobile device 104 may transmit the credential 112 to the lock device 102 as part of the pairing or connecting process. In other embodiments, the mobile device 104 may transmit the credential 112 to the lock device 102 after the two devices are connected or paired.

Process 300 proceeds from operation 304 to operation 306. At operation 306, the lock device 102 determines whether the credential 112 is valid or authenticates the credential 112. For example, the lock device 102 may determine whether the credential 112 represents a piece of unique information so that the lock device 102 and the mobile device 104 may be paired (e.g., via Bluetooth) or otherwise form a wireless connection. The lock device 102 may also receive the credential 112 after a connection is established and look up in a database whether the credential 112 has sufficient rights to access the door 106. If the credential 112 is approved, process 300 proceeds to operation 308. If the credential 112 is not approved, process 300 proceeds to operation 302 where the lock device 102 monitors for a mobile device 104.

At operation 308, the lock device 102 may use the accelerometer 105 to monitor or detect an intent action (e.g., a particular vibration signature) by the user. One or more types of intent actions may be detected such as rotating a lever on the lock device 102 or door 106, pressing a thumb-piece on the lock device 102, kicking the door 106, knocking on the lock device 102 or door 106, bumping a car key fob to the door 106, and/or any other action that the accelerometer 106 may detect. Once the intent action has been received, process 300 proceeds from operation 308 to operation 310. It is contemplated that if no intent action is received within a certain amount of time and/or the mobile device 104 moves away from the lock device 102, process 300 may proceed back to operation 302.

At operation 310, the lock device 102 determines whether the intent action detected is a valid or approved intent action. The lock device 102 may have a list of valid or approved intent actions that the lock device 102 uses to compare to the intent action detected by the accelerometer 105. It is contemplated that the lock device 102 monitors or analyzes data from the accelerometer 105 to determine whether a valid intent action occurred.

Process 300 proceeds from operation 310 to operation 312. At operation 312, the lock device 102 determines whether one or more intent action(s) were received within a predetermined timeframe from receipt of the credential 112, For example, if the lock device 102 received the credential 112 from the mobile device 104 When the mobile device 104 was several meters from lock device 102, it may take a user a few seconds walk up to the door 106 and perform an intent action. However, if the user stands near the door 106 for a prolonged period of time without performing an intent action, this may indicate that the user does not wish to access the area protected by the door 106. If the intent action was received within the timeframe, process 300 proceeds from operation 310 to operation 312. If the intent action was not received within the timeframe, then process 300 will proceed to operation 302.

At operation 314, the lock device 102 may determine whether one or more other criteria are met before deciding whether to unlock the lock mechanism 103. For example, the lock device 102 may ensure that the credential 112 was received before the intent action. In some embodiments, if the lock device 102 receives an intent action before the mobile device 104 approaches the door 106, all subsequent intent actions may be ignored for a period of time.

In another example, if the lock device 102 does not sense the mobile device 104 approach relatively close to the door 106 before detecting the intent action, the lock device 102 may ignore or disable recognizing intent actions for a period of time.

In yet another example, the lock device 102 may ensure that the mobile device 104 does not come closer to the lock device 102 and then move further away from the lock device 102, which may in turn indicate that the user does not wish to access the area protected by the door 106.

In another example, the lock device 102 may be configured to require two or more intent actions to signify intent within a predetermined timeframe of one another.

Other types of criteria, are also contemplated. If the other criteria are satisfied, process 300 proceeds from operation 314 to operation 316. If the other criteria. are not satisfied, process 300 proceeds from operation 314 to operation 302.

At operation 316, the lock device 102 unlocks the lock mechanism 103 to allow the user of the mobile device 104 access to the area protected by the door 106.

It is contemplated that in some embodiments, the mobile device 104 may be considered to be the credential 112.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected.

In reading the claims, it is intended that when words such as "a," "an," "at least one," or "at least one portion" are used there is no intention to limit the claim to only one item. unless specifically stated to the contrary in the claim. When the language "at least a portion" and/or "a portion" is used the item can include a portion and/or the entire item unless specifically stated to the contrary.

The invention claimed is:
1. An apparatus, comprising:
a lock device comprising an accelerometer for detecting motion of the lock device and a lock mechanism for controlling access through a door, the lock device configured to receive a credential from a mobile device, monitor a distance between the mobile device and the lock device, detect an intent action by a user of the mobile device in response to a specific vibration signature sensed by the accelerometer, and unlock the lock mechanism if the mobile device is within a predetermined distance from the lock device and the intent action is an approved intent action;
wherein to monitor the distance between the mobile device and the lock device comprises to determine a first distance between the mobile device and the lock device within the predetermined distance and determine a second distance between the mobile device and the lock device at a time subsequent to the determination of the first distance; and
wherein the lock device is configured to ignore possible intent actions by the user for a period of time subsequent to the determination of the second distance if the second distance is greater than the first distance.
2. The apparatus of claim 1, wherein the lock device and the mobile device communicate via Bluetooth communication.

3. The apparatus of claim 1, wherein the credential must be received by the lock device before the intent action is detected by the lock device in order for the lock device to unlock.

4. The apparatus of claim 1, wherein the credential must be received and the intent action must be detected within a predetermined timeframe.

5. The apparatus of claim 1, wherein the intent action includes at least one of rotating a lever and pressing a thumbpiece on the lock device.

6. The apparatus of claim 1, wherein the lock device is further configured to ignore all subsequent intent actions for a period of time if a first intent action was received by the lock device before the credential.

7. The apparatus of claim 1, wherein the lock device is structured to require two or more intent actions within a predetermined period of time to unlock.

8. A system comprising the apparatus of claim 1, and further comprising:
   a smartphone;
   wherein to receive the credential from the mobile device comprises to receive a credential from the smartphone;
   wherein to monitor the distance between the mobile device and the lock device comprises to monitor a distance between the smartphone and the lock device utilizing a received signal strength indicator;
   wherein to detect the intent action by the user of the mobile device comprises to detect an intent action by a user of the smartphone in response to a specific vibration signature sensed by the accelerometers; and
   wherein to unlock the lock mechanism comprises to unlock the lock mechanism if the smartphone is within a predetermined distance from the lock device and the intent action is an approved intent action.

9. The apparatus of claim 1, wherein the lock device is configured to detect the intent action by the user in response to a combination of at least two different vibration signatures sensed by the accelerometer.

10. The apparatus of claim 1, wherein to detect the intent action comprises to:
    sense a vibration signature with the accelerometer; and
    compare the sensed vibration signature to a plurality of valid vibration signatures associated with valid intent actions, wherein the sensed vibration signature is ignored by the lock device if the sensed vibration signature does not match one of the valid vibration signatures.

\* \* \* \* \*